United States Patent
Günther et al.

(10) Patent No.: US 10,762,778 B2
(45) Date of Patent: Sep. 1, 2020

(54) DEVICE, METHOD, AND COMPUTER PROGRAM FOR CAPTURING AND TRANSFERRING DATA

(71) Applicant: VOLKSWAGEN AKTIENGESELLSCHAFT, Wolfsburg (DE)

(72) Inventors: Hendrik-Jörn Günther, Hannover (DE); Stefan Gläser, Braunschweig (DE); Monique Engel, Braunschweig (DE); Bernd Rech, Bokensdorf (DE); Bernd Lehmann, Wolfsburg (DE); Sandra Kleinau, Rötgesbüttel (DE); Teodor Buburuzan, Braunschweig (DE); Johannes Hartog, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/308,274

(22) PCT Filed: Jun. 7, 2017

(86) PCT No.: PCT/EP2017/063782
§ 371 (c)(1),
(2) Date: Dec. 7, 2018

(87) PCT Pub. No.: WO2017/211868
PCT Pub. Date: Dec. 14, 2017

(65) Prior Publication Data
US 2019/0266892 A1      Aug. 29, 2019

(30) Foreign Application Priority Data
Jun. 8, 2016 (DE) .................... 10 2016 210 092

(51) Int. Cl.
*G08G 1/09* (2006.01)
*G08G 1/16* (2006.01)
*G08G 1/0967* (2006.01)
*G08G 1/0965* (2006.01)
*H04W 28/02* (2009.01)
*H04W 4/40* (2018.01)
*H04L 29/08* (2006.01)

(52) U.S. Cl.
CPC .......... *G08G 1/093* (2013.01); *G08G 1/0967* (2013.01); *G08G 1/161* (2013.01); *H04L 67/12* (2013.01);
(Continued)

(58) Field of Classification Search
None
See application file for complete search history.

(56) References Cited

U.S. PATENT DOCUMENTS 9,720,412 B1 * 8/2017 Zhu ................ G05D 1/0088
2002/0030611 A1   3/2002 Nuesser et al.
(Continued)

FOREIGN PATENT DOCUMENTS

DE   102011077998 A1   1/2012
DE   102010038640 A1   2/2012
(Continued)

OTHER PUBLICATIONS

Search Report for German Patent Application No. 10 2016 210 092.0; dated Apr. 25, 2017.
(Continued)

*Primary Examiner* — Mohammed Rachedine
(74) *Attorney, Agent, or Firm* — Barnes & Thornburg LLP

(57) ABSTRACT

A method captures data and transfers the data from a transmitter to a receiver, which is a transportation vehicle, and controls the capture and transfer of data. The method produces data and transfers the data from a transmitter to a receiver, which is a traffic participant. The data are based on a geographic environment model of the transmitter, wherein the geographic environment model includes a recognition of objects. Operations at the transmitter include capturing
(Continued)

parameters of a transfer system for transferring the data and/or traffic-relevant parameters of the transmitter, producing the data in accordance with the recognized objects, and transferring the data in accordance with the parameters of the transfer system and/or the traffic-relevant parameters of the transmitter.

17 Claims, 6 Drawing Sheets

(52) U.S. Cl.
CPC ......... *H04W 4/40* (2018.02); *H04W 28/0226* (2013.01); *H04W 28/0252* (2013.01)

(56) References Cited

U.S. PATENT DOCUMENTS

| 2004/0016870 | A1* | 1/2004 | Pawlicki | B60W 10/20 250/208.1 |
|---|---|---|---|---|
| 2009/0081958 | A1 | 3/2009 | McNew et al. | |
| 2009/0125177 | A1* | 5/2009 | Tanaka | B60G 17/0165 701/31.4 |
| 2013/0201051 | A1* | 8/2013 | Kreter | G01S 13/91 342/52 |
| 2013/0278440 | A1 | 10/2013 | Rubin et al. | |
| 2013/0336120 | A1 | 12/2013 | Bai | |
| 2017/0132923 | A1* | 5/2017 | Li | G08G 1/0112 |

FOREIGN PATENT DOCUMENTS

| DE | 102012210059 A1 | 12/2013 |
|---|---|---|
| DE | 102012210344 A1 | 12/2013 |
| DE | 102012219637 A1 | 4/2014 |
| EP | 2843639 A1 | 3/2015 |
| WO | 2006106455 A2 | 10/2006 |
| WO | 2008104886 A2 | 9/2008 |
| WO | 2015144887 A2 | 10/2015 |

OTHER PUBLICATIONS

Search Report for International Patent Application No. PCT/EP2017/063782; dated Sep. 22, 2017.

* cited by examiner

DEVICE, METHOD, AND COMPUTER PROGRAM FOR CAPTURING AND TRANSFERRING DATA

PRIORITY CLAIM

This patent application is a U.S. National Phase of International Patent Application No. PCT/EP2017/063782, filed 7 Jun. 2017, which claims priority to German Patent Application No. 10 2016 210 092.0, filed 8 Jun. 2016, the disclosures of which are incorporated herein by reference in their entireties.

SUMMARY

Exemplary embodiments relate in general to the capture and transfer of data from a transmitter to a receiver, which is designed as a transportation vehicle, and in particular, to the control of the capture and transfer of such data.

BRIEF DESCRIPTION OF THE DRAWINGS

Some exemplary embodiments are described in more detail hereafter with reference to the accompanying figures. Shown are.

DETAILED DESCRIPTION

Figure 1:
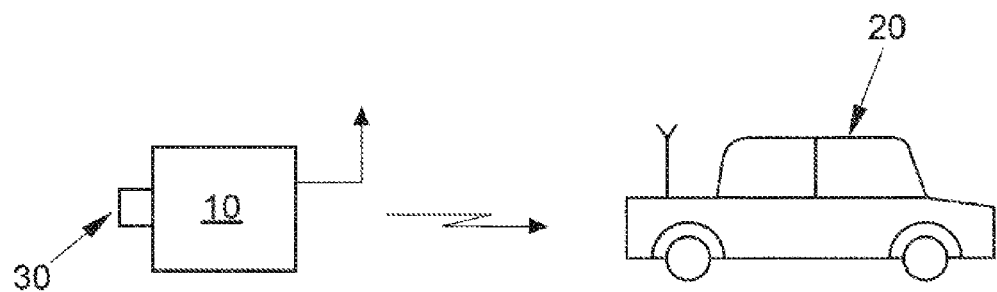
FIG. 1 shows a schematic block diagram of the V2X communication.

To optimize the flow of traffic, prevent traffic accidents and increase driving comfort, cooperative driving functions are being developed. One application used for this purpose is the V2X (vehicle to X, where X can stand, for example, for transportation vehicle or infrastructure) technology, which enables an ad-hoc communication process between transportation vehicles. During the current introduction phase of V2X, only a low take-up rate of V2X vehicles is to be expected initially. The standardized V2X-messages (CAM (Cooperative Awareness Message) and DENM (Decentralized Environmental Notification Message)) used to date contain information which only relates to the status of the transmitting transportation vehicle. If additional information is also sent about the surrounding objects detected by the transmitting transportation vehicle (especially other transportation vehicles that are not V2X-enabled), the number of the transportation vehicles detected in the environment could be increased and the drawbacks of the initially low take-up rate could be overcome.

Such data from transmitting transportation vehicles or else from infrastructure would also be communicated as a supplement to the above-mentioned standardized V2X messages. In the process, the V2X messages are generated and transmitted periodically, see also the ETSI ITS-G5 Reference Architecture. A direct extension of this periodic generation and transmission to also include the additional data of the surrounding objects would not be compatible with the efficient use of the communication capacity, since a significant additional volume of traffic is to be expected with the adoption of the V2X technology as a result of the additional data.

It would be desirable, therefore, to generate the additional data for the surrounding objects according to demand and to transmit it in a manner appropriate to the situation, thus improving the efficiency of the V2X technology.

This is achieved by a device, a method and a computer program.

A core idea is the separation of the generation of the data from the transfer of the data between transmitter and receiver. The data are generated according to the information, collected by sensors or otherwise, from a geographical environmental model of the transmitter and according to the information extracted from these objects. The data thus generated are not transmitted automatically, however. Instead, their transmission depends upon environmental parameters of the transmitter, which can comprise traffic-relevant parameters at the transmitter, as well as parameters of the transmission system. The former include, for example, the road layout or the driving or traffic conditions at the transmitter. The latter include, for example, channel capacity, availability of receivers, or the presence of messages with higher priority. This method also includes a delayed transfer of data or the discarding of generated data. By decoupling the generation and transmission of the data and the linking of both processes to different parameters, a balance can be struck between the provision of relevant information and the usage of the transmission channel.

A first exemplary embodiment provides a method for generating and transferring data from a transmitter to a receiver, which is designed as a road user. The data are based on a geographical environment model of the transmitter. The geographical environment model for the road user comprises relevant objects in the geographical environment of the transmitter. Method operations for the transmitter comprise detecting parameters of a transmission system for transferring the data. Alternatively or additionally, the method operations comprise detection of traffic-related parameters of the transmitter. Method operations also comprise generating the data depending on the objects relevant to the road user. Method operations also comprise transferring the data depending on the parameters of the transmission system and/or the traffic-relevant parameters of the transmitter.

Transmitters can be designed as devices which comprise a transmitting device for the transmission of electromagnetic waves. These are designed for wireless transmission to a receiver which is designed to match the transmitter. Transmitter properties (and also receiver properties) can also be standardized, for example, in V2X technology, for example, in accordance with the above-mentioned ETSI ITS-G5 Reference Architecture.

In addition, the transmitter can also comprise a transportation vehicle, a possibly portable device of a road user, or else infrastructure, for example, as a traffic sign or road structure.

Road users are understood to mean receivers which can receive the transmitted data and participate in the road traffic. They can be transportation vehicles of all kinds, which can be designed to be motorized or non-motorized. Transportation vehicles can be designed to be single- or multi-track and comprise scooters, mopeds, motorcycles and passenger cars, camper vans, trucks and buses. Non-motorized transportation vehicles can comprise bicycles and of animal-powered transportation vehicles, for example, horsedrawn carriages. Also, pedestrians can also be regarded as road users who can be equipped with portable receiving devices, for example.

The geographical environment model extends around the transmitter and can cover a radius of 200 meters, for example. Transmitters include, for example, separate sensors, which can be designed as a radar, lidar, infrared or ultrasonic sensor or a camera, wherein the sensor data can be stored in a so-called data cloud. From this data cloud, for example, suitable algorithms extract the geographical environment model, which represents the information on the environment of the transmitter that is relevant to road use. The geographical environment model also comprises objects in the area around the transmitter.

Objects comprise items and road users, which are relevant to the assessment of the transportation vehicle environment. They can be classified into dynamic and static objects. Dynamic objects move relative to the road surface of the road user which is designed as a receiver and may be designed as additional motorized or non-motorized road users and comprise pedestrians, cyclists, mopeds, motorcycles and multi-track transportation vehicles of many different types. Static objects have a fixed geographical location and can be localized, for example, as infrastructure near to the road. They can comprise, for example, traffic lights or traffic structures, which can be implemented, for example, as guarding rails or bridges. The detection of the objects is based on sensor data or data received by the V2X technology, and can be carried out using known methods.

Environmental parameters of the transmitter describe the transmitter environment. They can be used to set a frequency of transmission of the data to be sent. Thus in the case of periodic transmission of the data, it is possible to adjust the transmission frequency of the data, which can be set, for example, between a minimum value and a maximum value.

Traffic-relevant parameters in the environment of the transmitter comprise statements relating to traffic, road conditions and road surface, thus the transmitter environment. They can also relate to transmission properties of the V2X communication and take into account channel utilization or other messages to be transferred.

The generation and transfer of the data can thus be related to various mutually independent parameters and can thus be optimized independently of each other. In some exemplary embodiments, traffic-relevant parameters can comprise data relating to the description of at least the transmitter, which is designed as a transportation vehicle, and/or a traffic condition and/or a road layout.

A status of the transmitter, which is designed as a transportation vehicle, can be the transportation vehicle's speed. Traffic conditions can comprise the density of the traffic, the distance to other road users as well as the rate of change of the particular detected status. The traffic condition may comprise a high traffic density, which can limit the "visibility range" of the dedicated sensors. At the same time, a higher number of transportation vehicles with V2X technology can be assumed, so that transportation vehicles will be increasingly able to be detected by other V2X subscribers. The road layout can be understood to mean the design of a road, which can comprise straight sections, curves, intersections, joining ramps or T-junctions.

Various relevant parameters can therefore be included in the determination of the transmission frequency.

In some exemplary embodiments, parameters of the transmission system can comprise a channel capacity of the channel for the data transfer and/or an availability of the at least one receiver and/or the presence of a message with a higher priority.

The channel capacity can be understood as meaning the utilization potential of the transmission channel. The channel capacity in this context is part of an information-theoretic description of a transmission channel. It specifies the maximum bit rate at which information can be transmitted over a channel without errors. As already mentioned, the transfer of the data can use the same channel on which the already standardized messages, such as CAM and DENM, are transmitted. This channel can also be standardized and has a certain total channel capacity, which is given by the standardization and also takes into account the traffic of other V2X subscribers. The remaining free channel capacity can be determined at the transmitter, for example, by observing the current bit rate on the channel. This can also be done via the Decentralized Congestion Control (DCC) used in the ETSI standard, however. Accordingly, the transfer of the data can be adjusted depending on the loading status, for example, by the data packet to be sent being discarded in the event of overload.

The availability of the at least one receiver can be determined, for example, by "listening" via V2X transmission or "seeing" via sensor devices of other V2X subscribers. Thus, if a transportation vehicle is neither "heard" nor "seen", it can then be assumed that there is no communication partner in the vicinity. In this case, the transfer of the data can be suspended.

The presence of a message with higher priority can be based on the standardized messages which are to be transferred via the same channel. Thus, for example, a CAM or a DENM message can be pending for transmission, which is assigned a higher priority.

Various essential transmission parameters can therefore be included in the determination of the transfer frequency.

Optionally, the channel capacity and/or the traffic-relevant parameters can influence the frequency at which the data are transferred.

In the case of periodic transmission, the frequency of transmission should be set as the frequency with which data are transferred.

By taking into account the channel capacity and the traffic-relevant parameters, the transfer frequency can take account of both an urgency of the transfer as well as the current transmission facilities.

In some exemplary embodiments, the channel for the data transfer is also used to transfer general attention messages—CAM—and/or decentralized environment messages—DENIM.

In this case, the CAM and the DENM according to ETSI standards TS 102 894-2 can be used. The CAM can then transfer transportation vehicle status messages of the transmitter. The DENM can implement a dedicated warning of hazard situations. Of course, messages can also continue to be transmitted over the channel, which can be both standardized and proprietary.

Therefore, the standardized V2X channel can be used in a variety of ways.

In some exemplary embodiments, the channel for the data transfer can be designed according to a standardized reference architecture.

The standardized reference architecture can use the ETSI TS 102 894-2, in which the above-mentioned CAM and DENM messages can also be transferred.

The implementation of other channels in addition to the channels defined in ETSI can thus be avoided, which means the occupation of other radio resources can be avoided.

Optionally, the transmitter can be designed as an additional road user or as infrastructure.

Infrastructure can be implemented as traffic signs, for example, as traffic lights, or as traffic structures, which comprise, for example, crash barriers or bridges, as already stated.

The number of the transmitters can thus also be increased using building structures, right at the beginning of the adoption process of V2X in transportation vehicles.

In some exemplary embodiments, the transmitter and/or receivers can be designed as transportation vehicles.

Thus even in the absence of infrastructure, the number of V2X subscribers can be increased and taken into account in the environmental parameters of the transmitter transportation vehicle.

In some exemplary embodiments, the geographical environment model of the transmitter can comprise an object recognition on the basis of local sensor data of the transmitter and/or on the basis of sensor data of other road users, or of infrastructure.

The object recognition based on the sensor data can be carried out in different ways. Thus, for example, a hierarchical model can be used, in which a data cloud with all sensor data is used as a basis. In a first operation, fragments of objects are then identified from the data of the data cloud, for example, parts of an arm, a torso or a head. In a second operation, it is then attempted to connect the fragments to sub-objects, thus to arms, a torso or a head. In the third operation, the actual object recognition is performed, which in the above example identifies the object as a person.

Sensor data from other road users or from infrastructure can also be exploited for object recognition. These information items can be received from the transmitter in advance of the object recognition. The information can then be added to the above-mentioned data cloud, so that in addition to the data determined by the transportation vehicle's own sensors, it can enrich the geographical environment model.

The database for the object recognition can thus be enlarged.

Optionally, the object recognition can comprise data for the probability of existence of the object and/or change information of the object, wherein the change information for the object describes temporal and/or spatial changes.

A probability of existence of detected objects depends essentially on a continuous detection of the object by the relevant sensors. In addition, sensor information becomes obsolete relatively quickly, be it because an object is removed from the observation space or is modified in this space.

The change information describes a measure of the change in the object. Thus, in the case of a large speed difference between the object and the transmitter, or due to the proper motion of the object, significant object changes can occur in a short period of time. Accordingly, increased computing power in relation to the object can be beneficial, as can an increased observation of the probability of existence.

Thus the object recognition and tracking can be improved by object-related parameters.

In some exemplary embodiments, various events can provide a pretext for generating the data. Thus a periodic generation can take place in an event-driven way. Alternatively, generation can take place as soon as an object is detected, or generation can take place as soon as an object is recognized with an overwhelming probability of existence. Further alternatively, a generation can be selected as soon as an object has exceeded a change measure, or a generation can be selected as soon as an object with an overwhelming probability of existence has exceeded a change measure.

Periodic generations have the property that their function values repeat at regular intervals. The intervals between the occurrence of the same function values are known as periods. A plurality of periodic generations can be implemented.

A first algorithm—A1—describes the periodic transmission of a message. The message can always be sent after a fixed time interval has elapsed, thus regardless of the existence of objects in an associated database.

A second algorithm—A2—describes the periodic sending of a message if an object is available at the same time, thus is stored in a transportation vehicle's own object database. The message can be sent after the expiry of a fixed time interval, even if the test for the availability of an object was successful.

A third algorithm—A3—describes the periodic sending of a message when an object is available and this is also still valid, thus when a threshold value relating to its probability of existence has been exceeded (for example, by comparison against other sensor data). The message in this case can be sent after the expiry of a fixed time interval.

Other possible periodicities are described in the exemplary embodiments.

The detection of objects is based on sensor data from the transportation vehicle environment and/or, where appropriate, on messages received via the V2X technology. The data obtained in this way can then be recorded in a data cloud and then analyzed, for example, with the above hierarchical model, for the presence of objects. Detected objects are recorded and examined on a regular basis. Accordingly, an object detection can represent a pretext for generating the data, as described.

The existence probability of an object is an essential parameter. It can be assigned to each object and can be subject to a regular update. An exceeding of a threshold value of this parameter can represent a pretext for generating the data, as has already been described.

Similarly to the existence probability, the change measure is a measure that can be assigned to the objects. It describes the degree of change of the object and, depending on a threshold of the data of the change measure, can affect the allocation of increased computing power for tracking the object and the frequency of its updating, or represent a pretext for generating the data. It can be updated on a regular basis.

Therefore, the generation of the data can be flexibly adapted to a plurality of events.

In some exemplary embodiments, the data in a data field can be transmitted via a mobile network. The data field can comprise the following: a header field with general information and the message identification and transportation vehicle/infrastructure identification. In addition, the data field can comprise a description field, which in turn comprises an identification of the transportation vehicle and/or a position of the transportation vehicle and/or a distance to the transportation vehicle and/or a speed of the transportation vehicle and/or an acceleration of the transportation vehicle and/or at least one property of the local sensors of the transportation vehicle. Furthermore, the data field can comprise a dynamic object container, which comprises the description of at least one dynamic object. In addition, the data field can comprise a static object container, which in turn comprises the description of at least one static object.

A more detailed description can be found in the exemplary embodiments.

Thus a functional structure can be chosen, which enables an efficient transmission of the data.

A further exemplary embodiment provides a device for the generation and transmission of data. The device comprises a generation processor for generating information of a geographical environment model of the device, wherein the geographical environment model for a road user comprises a detection of relevant objects in the geographical environment of the device. The device also comprises a capture processor for capturing parameters of a transmission system for transferring the data. In addition or alternatively, traffic-relevant parameters of the device are captured. The device further comprises a data generation processor, which generates the data depending on the recognized objects. The device also comprises a transmission device, which transfers the data depending on the parameters of the transmission system and/or depending on the traffic-relevant parameters to a receiver, which is designed as a road user.

A generation processor is designed to generate information from the environment of the device. This can be done using sensor data, which observe the environment of the device. These data can be stored, for example, in a data cloud or another form of storage and then imported into the geographical environment model. The latter also comprises the identification of objects in the environment of the device. The generation processor used can be designed as a standard commercial processor, as an ASIC, as a digital signal processor, as a circuit arrangement or as similar components.

A capture processor for capturing parameters of a transmission system for transferring the data and/or traffic-relevant parameters—jointly also referred to as environmental parameters—can be designed in a technically similar way to the generation processor, in which case it is suitable for capturing environmental parameters of the transmitter. The traffic-relevant parameters of the environmental parameters can also be captured with sensors which detect the traffic situation or the road layout, for example. The parameters of the transmission system in the environmental parameters can comprise the channel capacity or the availability of receivers, which are based on radio technology.

A data generation processor can be designed as a processor, which is suitable for converting the information from the geographical environment model into the structure of the data to be transferred. It is suitable for embedding the object information into the data.

A transmission device is suitable for the wireless transmission of electromagnetic waves in the transmit and receive directions in a transmission system. It can be designed in accordance with the V2X technology already mentioned several times, and thus be suitable for communication with many road users and/or infrastructure, in particular, in the event of increasing adoption of the standard.

The generation and transfer of the data can thus be related to various mutually independent parameters and can thus be optimized independently of each other. Optionally, the device can also be designed as a transportation vehicle or as a transport infrastructure construction.

Transportation vehicles can be road users and designed as transportation vehicles of all types, as described earlier. Transport infrastructure constructions can be traffic sign equipment and can be designed, for example, as traffic lights or multi-function displays. But they can also be designed as outwardly passive constructions, for example, as a flashing system for detecting speeding incidents. Other structures in close proximity to traffic can also be suitable.

Thus, in the early stages of the V2X technology a basic inventory of V2x subscribers can be created by buildings, which will later be supplemented with increasing uptake of the technology in transportation vehicles.

A further exemplary embodiment provides a computer program for carrying out the method when the computer program is running on a programmable hardware component.

Various exemplary embodiments will now be described in more detail with reference to the accompanying drawings, in which a number of exemplary embodiments are shown. In the figures, the thickness dimensions of lines, layers and/or regions are shown exaggerated for the sake of clarity.

In the following description of the attached figures, which only show some exemplary examples, the same reference numerals can be used to designate identical or equivalent components. In addition, collective reference numerals can be used for components and objects, which occur multiple times in at least one exemplary embodiment or in a drawing, but which are described together in relation to one or more features. Components or objects described with the same or collective reference numerals can be embodied in the same way in terms of individual, multiple or all features, for example, in terms of their dimensions, but may also be embodied differently, unless otherwise explicitly or implicitly given by the description.

Although exemplary embodiments can be modified and amended in different ways, the exemplary embodiments shown in the figures are examples and are described in detail herein. It should, however, be made clear that it is not intended to restrict exemplary embodiments to the particular disclosed forms, but that instead exemplary embodiments should cover functional and/or structural modifications, equivalents and alternatives which lie within the field of the disclosure. Identical reference numerals designate the same or similar elements throughout the description of the figures.

Unless otherwise defined, all of the terms used herein (including technical and scientific terms) have the same meanings as would be ascribed to them by an average person skilled in the art in the field to which the exemplary embodiments belong. It should also be clarified that expressions, such as those that are defined in commonly used dictionaries, are to be interpreted as if they had the meaning consistent with their meaning in the context of the relevant technology, and should not be interpreted in an idealized or overly formal sense unless this is expressly defined herein.

FIG. 1 shows a schematic block diagram of the V2X communication. In the figure, a transmitter 10 transfers data to a receiver 20, which is designed as a road user. The transmission is effected wirelessly by electromagnetic waves. The receiver is designed as a passenger car. The data can be sent as an Environmental Perception Message (EPM), which is similar in structure to the well-known CAM and DENM messages and is explained in greater detail under FIG. 6.

Figure 2:
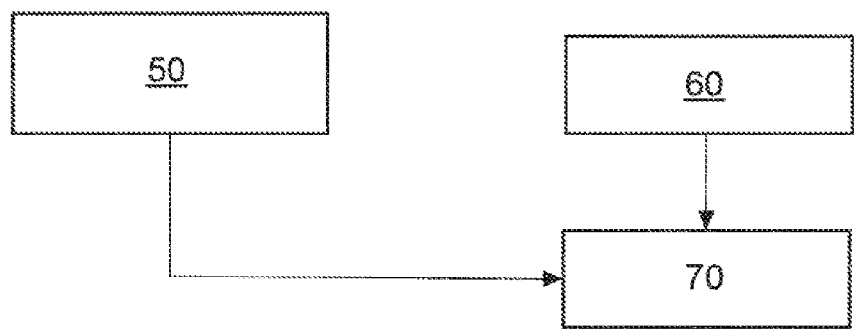
FIG. 2 shows a method according to an exemplary embodiment.

FIG. 2 illustrates a method in accordance with an exemplary embodiment. This is a method for generating and transferring data from a transmitter to a receiver, which is designed as a road user. The data are based on a geographical environment model of the transmitter, wherein the geographical environment model comprises a recognition of objects. Method operations at the transmitter comprise the capture 50 of parameters of a transmission system for the transfer of data, generation 60 of the data depending on the recognized objects and transferring 70 the data depending on the environmental parameters of the transmitter.

Figure 3:
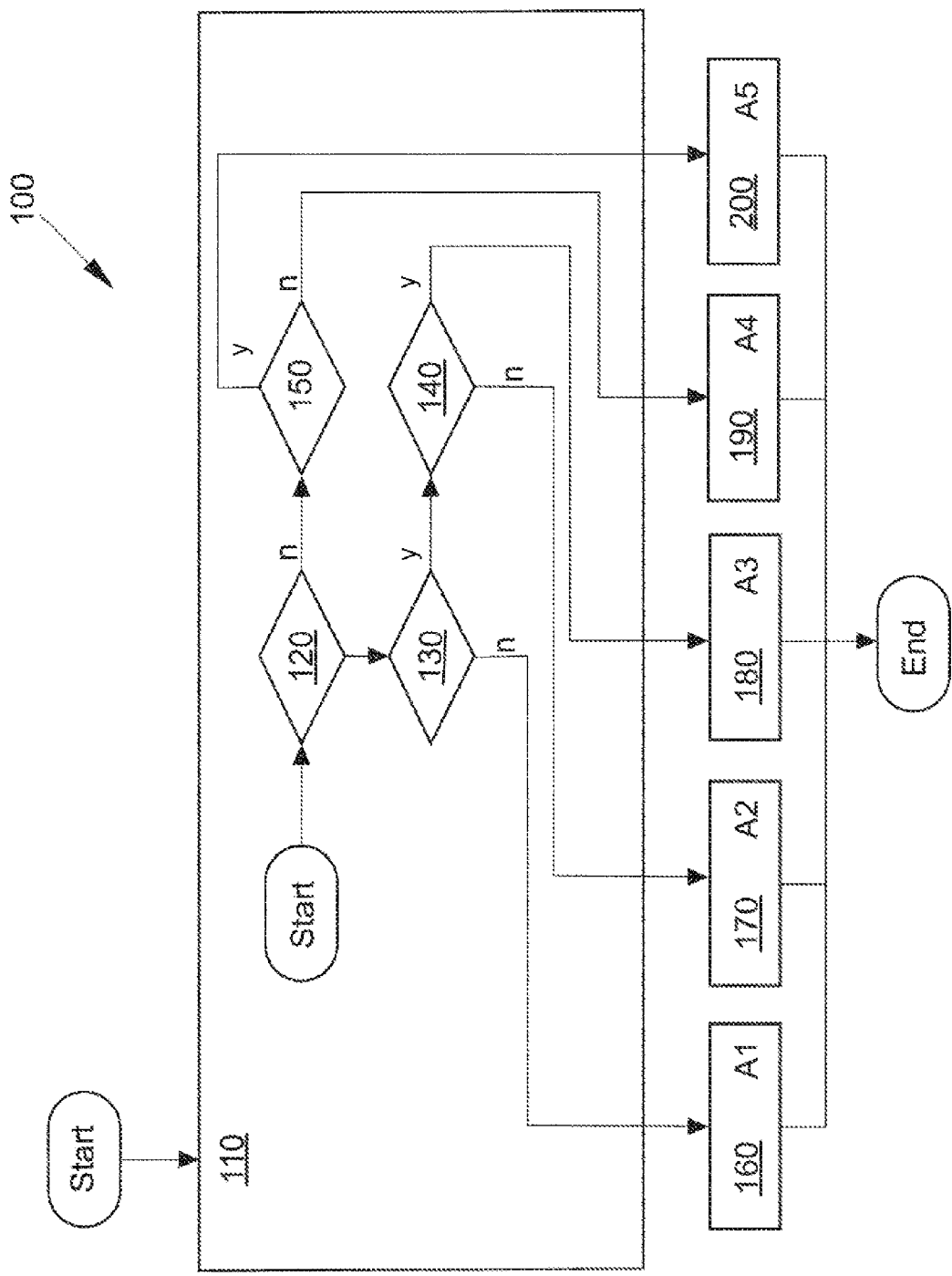
FIG. 3 shows a determination of the data generation.

FIG. 3 shows a determination of the data generation 100. This process is used to specify which pretext applies to the generation of the data. Thus, the pretext is defined in the parent procedure 110. The parent procedure 110 comprises a start procedure which flows into the query "Periodically generate the data?" 120. This pretext can be selected for a transportation vehicle with high priority (e.g., an ambulance in service), or if no communication partner has yet been detected. Therefore, a response can be hoped for during periodic transmission. Further, it can be assumed that the information "I do not detect any object in my environment." is also relevant to other subscribers of the V2X technology.

If "Periodically generate the data?" 120 evaluates affirmatively, the algorithm branches into the procedure "Generate the data when object present?" 130. This alternative can be selected if the information "I detect an object in my environment" is relevant to others.

If the procedure "Generate the data with object present?" 130 evaluates affirmatively, the algorithm branches to "Generate the data when object valid?" 140. This pretext can be selected when the information "I detect a valid object in my environment" is exclusively relevant to others. This provides the security that no "phantom objects" are sent, which has the positive side effect that the transmission channel is not unnecessarily loaded. If the procedure "Generate the data when object present?" 130 evaluates negatively, the periodic transmission 160 is specified with procedure A1.

If the procedure "Generate the data when object valid?" 140 evaluates negatively, "Periodically generate the data when object is available" 170 is then specified as procedure A2. If, on the other hand, the procedure 140 evaluates affirmatively then a "Periodically generate the data when valid object is available" procedure A3/180 is specified. In this case the information "I detect a valid object in my environment" can be relevant to others. This provides the assurance that no "phantom objects" are sent, which has the positive side effect that the channel is not unnecessarily loaded.

If the procedure "Periodically generate the data" 120 evaluates negatively, the algorithm branches to "Generate the data when object valid?" 150. If it evaluates affirmatively, then procedure A5 "Generate the data when a valid object changes" 200, is specified. In the negative case, in procedure 150 "Generate the data when an object changes" A4, procedure 190 is specified. This is an even stricter restriction on the above-mentioned case. The benefit gained here is the increased transmission discipline, which can have a positive effect on the channel load of the transmission channel.

Figure 4:
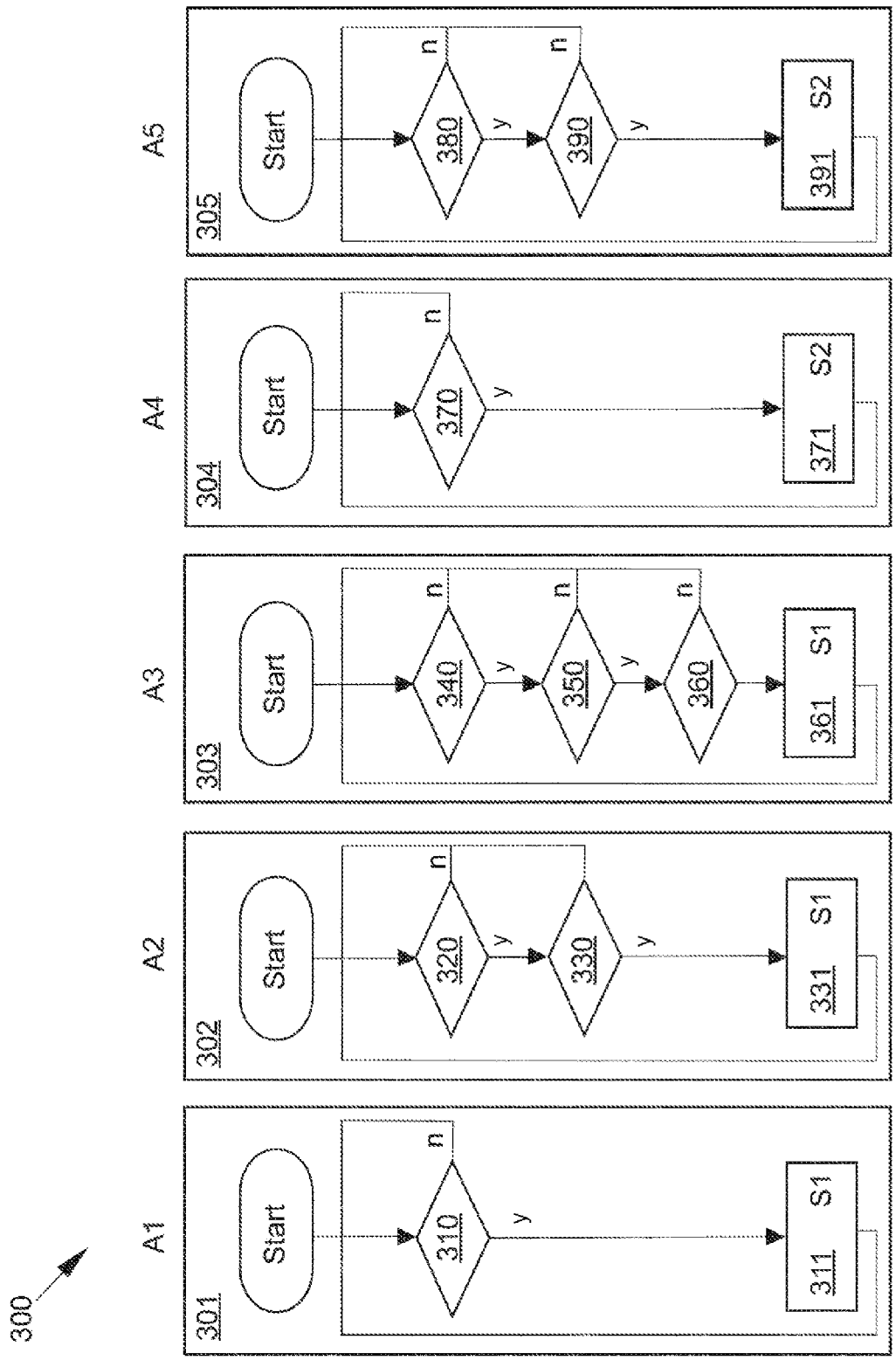
FIG. 4 shows alternative forms of generation of the data.

FIG. 4 shows the alternative forms of data generation. Thus, in the diagram 300, different algorithms for generating the data are shown. For periodic data generation 301/A1, the algorithm branches into the procedure "Time interval elapsed?" 310, wherein in the affirmative case the algorithm branches to data generation for periodic transmission S1. In the negative case the procedure 310 is reached again.

In the case of periodic data generation, procedure A2 or 302, if an object is available the procedure "Time interval has expired?" 320 is activated. In the negative case the procedure 320 is reached again. In the affirmative case the algorithm branches to the procedure "Is object available?" 330. If it is negative, the algorithm again branches to procedure 320. In the affirmative case the algorithm branches to the periodic transmission procedure S1/331.

In the case of periodic data generation, if a valid object is available, procedure 303/A3, the algorithm branches to procedure 340 corresponding to procedures 310 and 320. In the affirmative case the algorithm branches to procedure 350 corresponding to procedure 330. In turn, in the affirmative case the algorithm branches to procedure "Is object valid?" 360. If this evaluates affirmatively the algorithm branches to state "periodic transmission S1" 361, in the negative case it branches back to procedure 340.

For aperiodic generation of data, in the event of a change in an object 304/A4, operation branches to procedure "Has object changed?" 370. In the affirmative case the algorithm branches to procedure "aperiodic transmission S2" 371. If it evaluates negatively, the algorithm again branches to procedure 370.

For aperiodic data generation, in the event of a change in a valid object 305/A5, operation branches to procedure 380 corresponding to procedure 370. In the affirmative case, operation branches to procedure "Is object valid?" 390. If procedure 390 evaluates affirmatively the algorithm branches to procedure "aperiodic transmission S2" 391, and in the negative case it branches back to procedure 380.

Figure 5:
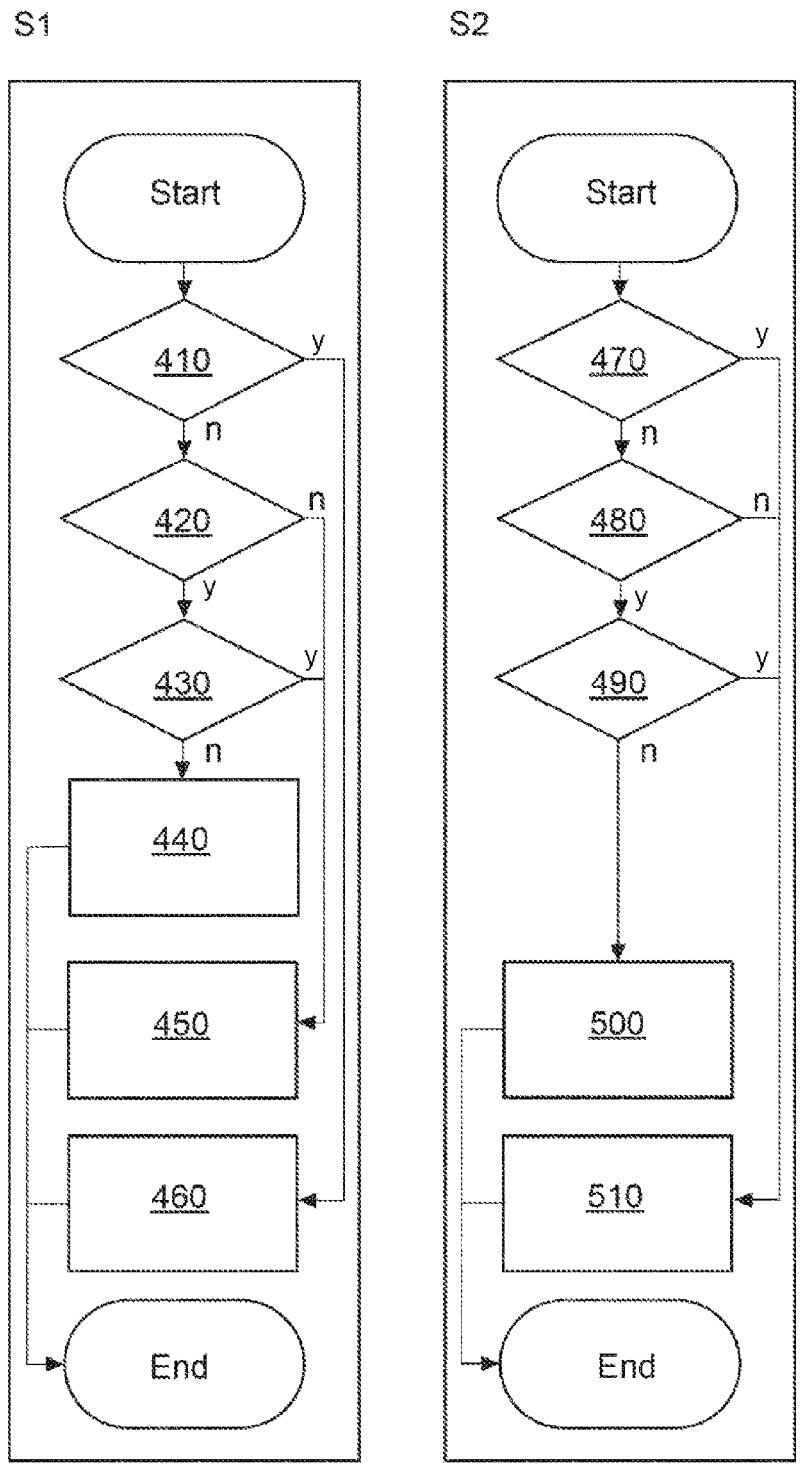
FIG. 5 shows transmission processes for periodic and aperiodic data generation.

FIG. 5 shows transmission procedures for data generated periodically, S1, or aperiodically, S2. The procedures S1 or S2 are reached from the generation forms of FIG. 4, which in turn end in the procedures S1 or S2.

Thus after the start the process S1 shows the procedure "Is higher-priority message present?" 410. If this evaluates affirmatively, operation branches to procedure "Do not send" 460 and the generated data are discarded. In the negative case the algorithm branches to procedure "Does a communication partner exist?" 420. In the negative case, operation branches to "Send with long period (seldom)" 450 and transmission takes place at specified long intervals. This can be achieved by applying a regular delay to the transmission procedure. In the affirmative case, operation branches to procedure "Is transmission channel overloaded?" 430. In the affirmative case, operation again branches to procedure 450, and in the negative case it branches to "Send with short period (often)" 440 and transmission takes place at short intervals. This can be achieved by immediate execution of the transmission procedure. All branches are terminated upon reaching the END operation.

As an alternative to the long-periodic 450 and short-periodic transmission 440, the transmitting frequency can also be changed incrementally between these two values. For this purpose, additional parameters can be used which are not shown in FIG. 5 and which extend the procedures 440 and 450. In this case, the period for the long-periodic 450 or the short-periodic transmission 440 can be additionally adjusted depending on parameters for driving conditions, road characteristics, road layout and traffic conditions.

Adjustment by the driving conditions: it can be beneficial to increase the transmission frequency of the EPM when the transmitting transportation vehicle is travelling faster. This is because the environment of this transportation vehicle also changes faster. Accordingly, in a similar way to the GALA (speed-dependent volume adjustment) signal for a car radio), the transmission period could vary, for example, in proportion to the transportation vehicle speed.

Adjustment due to the road characteristics: it can be beneficial to change the transmission frequency depending on the characteristics of the road. Thus, it appears to be useful to transmit an EPM more often in city traffic than on a country road or when driving on the freeway. Because in the city the environment is generally changing more rapidly than on country roads or when driving on the freeway. The transmission period could be varied by a fixed factor, typical of the road characteristics.

Adjustment due to the layout of the road: it can be beneficial to increase the transmission frequency by a fixed factor when the transportation vehicle is on a bend, at an intersection, joining ramp or T-junction, because the environment is probably changing rapidly there. In the algorithm S1 therefore, a fixed factor should be applied to the transmission states "Send with short period" and "Send with long period".

Adjustment due to the traffic conditions: It can be beneficial to decrease the transmission frequency of the EPM when the traffic is heavier. Because the poorer the view of the transportation vehicle sensors becomes, the higher is the probability that an object has already been detected by another transportation vehicle. The transmission period could vary (similar to the GALA signal in the case of the car radio), for example, in proportion to the density of traffic.

After the start the procedure S2 for the aperiodic transmission branches into the procedure "Is higher-priority message present?" 470, similarly to procedure 410. If this evaluates affirmatively, operation branches to procedure 510 "Do not send" and the generated data are discarded. In the negative case the algorithm branches to procedure "Does a communication partner exist?" 480. If procedure 480 evaluates negatively, operation again branches to procedure 510 and the data are discarded. In the affirmative case, operation branches to procedure "Is transmission channel overloaded?" 490. In the affirmative case, operation again branches to procedure 510 and the data are discarded. In the negative case, operation branches to procedure "Send" 500 and the data are sent. All branches are terminated upon reaching the END operation.

Figure 6:
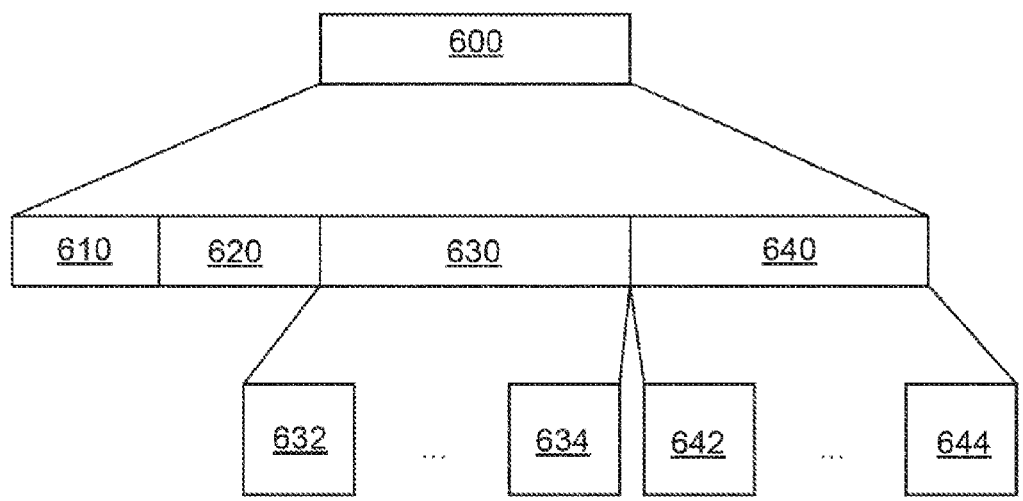
FIG. 6 shows a structure of a data field for the data transmission.

FIG. 6 shows a structure of a data field 600 for transmitting the data, which can be received via an air interface. This data field 600 contains data from the transmitter. It can additionally contain data of third-party EPM subscribers which were previously accessible to the transmitter. The data field 600 comprises a header 610, which can be designed, for example, as a standard ITS-S (Intelligent Transport Systems Station) based on ETSI TS 102 894-2. It is used to identify the data field 600. A description field 620 can then be arranged, which can comprise an identification of the transmitter and/or a position of the transmitter and/or a distance to the transmitter, which is designed as a transportation vehicle, and/or a speed of the transportation vehicle and/or an acceleration of the transportation vehicle and/or at least one property of the local sensors of the transmitter. In the following dynamic object container 630, the dynamic objects can be transmitted. In the subsequent static object container 640, the static objects can be transmitted. A dynamic object 632, 634 can comprise sensor information of the transmitter and/or a localization information item, which contains a local or global reference variable and/or dynamic information for describing the object dynamics and/or a classification of the object and/or an estimated geometric dimensions of the object. A static object 642, 644 can comprise sensor information of the transmitter and/or a localization information item and/or a classification of the object and/or an estimated geometric dimensions of the object or an occupancy grid of a detection space.

Figure 7:
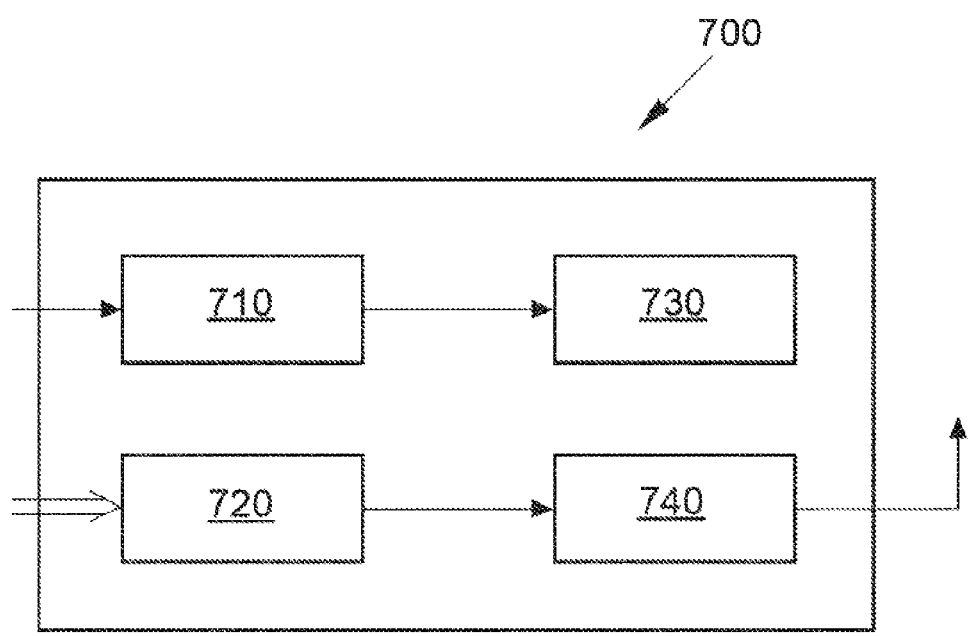
FIG. 7 shows a schematic block diagram of a device for generating and transferring data

FIG. 7 shows a schematic block diagram of a device 700 for generating and transferring data. The data is transmitted to a receiver which is designed as a road user. A generation processor 710 is used to generate information of a geographical environment model of the device, wherein the geographical environment model comprises recognition of objects. A data generation processor 730 generates data to be transmitted depending on the recognized objects. A capture processor 720 is used for capturing environmental parameters of the device, for example, the free channel capacity or the road characteristics. A transmission device 740 transmits the data as a function of the environmental parameters to a receiver, which is designed as a road user.

In general, it can be shown that the efficiency in the utilization of the message transmission channel depends substantially on the algorithm used for the message generation and message transmission.

For the generation of messages (generation mode) the following options are available in principle:
1. aperiodic (event-driven)

An EPM is generated whenever any of the following applies since the generation of the last EPM:
    the direction or orientation of the observed object has changed by more than 4°,
    the observed object has moved by more than 4 meters,
    the speed of the observed object has changed by more than 0.5 meters/second.

2. periodic
2.1. constant repetition rate
2.2. variable repetition rate
    2.2.1. similar to the CAM standard, but which in contrast to the disclosure does not separate the generation and the transfer.

As in the CAM, the EPM is generated with a specified minimum repetition rate. This repetition rate is increased to predefined values if any of the following applies since the generation of the last EPM:
    the direction or orientation of the observed object has changed by more than 4°,
    the observed object has moved by more than 4 meters,
    the speed of the observed object has changed by more than 0.5 meters/second.

2.2.2. not similar to the CAM standard (proprietary)

Alternatively, the EPM can be generated according to the following criteria:
a. periodically, but regardless of whether an object has been detected or not
b. as soon as objects are ready for transmission, whether valid or not
c. as soon as one of the managed objects has changed (according to CAM criteria, see above)
d. as soon as objects are available that have been validated
e. an optional container with the field-of-view (static) is only generated, for example, once per second
    2.2.2.e. is an option that can always be applied, regardless of the rest of the remaining conditions mentioned.

Another possibility is to permanently set the above-mentioned generation mode once and for all. Alternatively, the algorithm could have the format, for example, as shown in FIG. 3. Therefore, the algorithm would start as soon as the ignition has been switched on. If data are required to be generated periodically, it must be decided whether the data should be generated continuously or only when an object is available. In the latter case, it is also necessary to decide whether data are to be generated every time there is a change in an object or only when this object is valid. Alternatively, if data are to be generated aperiodically, it must be decided whether only valid objects data are to be created. The algorithm is terminated when the ignition is switched off.

Depending on which generating mode is selected, different algorithms will be processed (see algorithms A1 to A5 in FIG. 4). The generating state is entered in each case as soon as the ignition is switched on, or the algorithm according to FIG. 3 has been processed. It ends as soon as the ignition is switched off, or the algorithm according to FIG. 3 has been exited after the ignition has been switched off.

FIG. 4, algorithm A1 describes the periodic generation of a message. The message in this case is generated after the expiry of a fixed time interval.

FIG. 4, algorithm A2 describes the periodic generation of a message if an object is available at the same time, in other words if it is stored in the transportation vehicle's own object database. The message is generated after the expiry of a fixed time interval, even if the test for the availability of an object was successful.

FIG. 4, algorithm A3 describes the periodic generation of a message when an object is available and is also still valid at the same time, thus internally to the transportation vehicle with regard to its validity (for example, by comparison against other sensor data) it was found to be valid. The message is generated after the expiry of a fixed time interval, even if the verification of the availability of an object was successful and the test of the validity of this object was successful.

FIG. 4, algorithm A4 describes the aperiodic generation of a message when an object has changed. The message is always generated as soon as it has been detected that an object has changed in accordance with the above-mentioned criteria for aperiodic transmission.

FIG. 4, algorithm A5 describes the aperiodic transmission of a message when a change occurs in a valid object with an existence probability exceeding a threshold value. The message is always generated as soon as it has been detected that an object has changed, which internally to the transportation vehicle with regard to its validity (for example, by comparison against other sensor data) was also found to be valid.

The transmission algorithms S1 and S2 for the algorithms A1 to A2 in FIG. 5 are substantially identical. They differ only by an additional state for the periodic transmission in S1. This takes account of the fact that it may make sense to keep the transmission period flexible depending on the condition of the transportation vehicle, the driving situation, the road or the traffic. The following examples are intended to demonstrate this:

Driving condition: Speed
Road characteristic: Freeway, country road, downtown
Road topology: Curve, intersection, T-junction, joining ramp
Traffic condition: "heavy"

The transmission algorithms are entered in each case when they are invoked from one of the above algorithms A1 to A5. They end after they have been executed once and then return to the calling algorithm (see FIG. 4).

For the periodic transmission, the transmitting algorithm S1 is used. Here a distinction is made between short-periodic and long-periodic transmission. With a long period, it is possible to send even when the transmission channel is overloaded. This is used to reduce the data traffic. Otherwise, short-periodic transmission is used.

In the case of aperiodic transmission, it is proposed here only to transmit if the transmission channel is not overloaded.

The features disclosed in the present description, the claims and the drawings can be of significance and implemented both individually as well as in any desired combination to realize an exemplary embodiment in its various configurations.

Although some facets have been described in connection with a device, it goes without saying that these facets also represent a description of the corresponding method, so that a block or a component of a device is also to be understood as a corresponding method operation or as a feature of a method operation. Similarly, properties that have been described in relation to or as a method operation also represent a description of a corresponding block or detail or feature of a corresponding device.

In general, exemplary embodiments can be implemented as software, firmware, computer program or computer program product with a program code or as data, wherein the program code is, or the data are, effective in terms of carrying out one of the methods if the program is running on a processor or a programmable hardware component. The program code and/or the data can also be stored, for example, on a machine-readable medium or data carrier. The program code or the data can exist as source code, machine code or byte code, among other things, as well as other intermediate code.

The examples described above only represent an illustration of the principles of the present disclosure. It is implicit that modifications and variations of the arrangements and details described herein will be apparent other persons skilled in the art. It is therefore intended that the disclosure be limited only by the scope of protection of the following patent claims and not by the specific details, which have been presented herein on the basis of the description and explanation of the exemplary embodiments.

LIST OF REFERENCE NUMERALS

10 Transmitter
20 Receiver
30 Sensors of the transmitter
50 Acquisition of environmental parameters
60 Generation of the data
70 Transfer of the data
100 Selection of generation mode
110 Selection procedure of generation mode
120 Periodically generate the data?
130 Generate the data when object present?
140 Generate the data when object valid?
150 Generate the data when object valid?
160 Periodic generation of the data
170 Periodically generate the data when object is available
180 Periodically generate the data when valid object is available
190 Generate the data when an object changes
200 Generate the data when a valid object changes
300 Algorithms for generating the data
301 Periodically generate the data
302 Periodically generate the data when object is available
303 Periodically generate the data when valid object is available
304 Generate the data when an object changes
305 Generate the data when a valid object changes
310/320/340 Time interval elapsed?
311/331/361 Periodic transmission S1
371/391 Aperiodic transmission S2
330/350 Is object available?
360/390 Is object valid?
370/380 Has object changed?
410/470 Is a higher-priority message present?
420/480 Does a communication partner exist?
430/490 Is transmission channel overloaded?
440 Send with short period (often)

450 Send with long period (seldom)
460/510 Do not send
500 Send
600 Data field
610 Header
620 Description field
630 Dynamic object container
632 Dynamic object
634 Dynamic object
640 Static object container
642 Static object
644 Static object
700 Device for generating and transferring data
710 Generation processor
720 Capture processor
730 Data generation processor
740 Transmission device

The invention claimed is:

1. A method for generating and transferring data from a transmitter to a receiver, which is a road user, the method comprising:
    capturing parameters of a transmission system to be used for transferring the data and capturing traffic-relevant parameters in a geographical environment of the transmitter, wherein capturing the traffic-relevant parameters includes analyzing, using a geographical environment model, the geographical environment for objects relevant to the road user;
    generating data based on the captured traffic-relevant parameters; and
    transferring the generated data from the transmitter to the road user, based on the parameters of the transmission system, wherein the road user is an emergency vehicle, wherein transferring of the data alters from a periodic transferring, that occurs in response to an expiration of a regular time interval, to an aperiodic transferring, that occurs in response to a change in the object relevant to the emergency vehicle, and wherein the periodic transferring includes delaying transferring the data until the expiration of the regular time interval without the object relevant to the emergency vehicle having been detected thereby indicating that relevant objects have not been detected.

2. The method of claim 1, wherein the traffic-relevant parameters comprise data relating to the description of at least the transmitter, which is a transportation vehicle, and/or a traffic conditions and/or a road layout.

3. The method of claim 2, wherein the parameters of the transmission system comprise a channel capacity of the channel for the data transfer and/or an availability of the at least one receiver and/or the presence of a message with a higher priority.

4. The method of claim 2, wherein the channel capacity and/or the traffic-relevant parameters influence the frequency at which the data are transferred.

5. The method of claim 1, wherein the channel for the data transfer is also used to transfer general attention messages and/or decentralized environment messages.

6. The method of claim 1, wherein the channel for the data transfer is designed according to a standardized reference architecture.

7. The method of claim 1, wherein the transmitter is an additional road user or infrastructure.

8. The method of claim 1, wherein transmitter and/or receiver are transportation vehicles.

9. The method of claim 1, wherein the geographical environment model of the transmitter comprises an object recognition based on local sensor data of the transmitter and/or based on sensor data of other road users or infrastructure.

10. The method of claim 9, wherein the object recognition comprises data for a probability of existence of the object and/or for change information of the object, wherein the change information for the object describe temporal and/or spatial changes.

11. The method of claim 1, wherein generating of the data is in response to at least one of:
    an object being recognized with an overwhelming probability of existence; or
    an object having exceeded a change measure; or
    an object recognized with an overwhelming probability of existence having exceeded the change measure.

12. The method of claim 1, wherein the data in a data field are transmitted via a mobile network, the data field comprising:
    a header field with general information and the message and transportation vehicle/infrastructure identification; and/or
    a description field, which comprises an identification of the transportation vehicle and/or a position of the transportation vehicle and/or a distance to the transportation vehicle and/or a speed of the transportation vehicle and/or an acceleration of the transportation vehicle and/or at least one property of the local sensors of the transportation vehicle; and/or
    a dynamic object container, which comprises the description of at least one dynamic object; and/or
    a static object container, which comprises the description of at least one static object.

13. A device for generating and transferring data, the device comprising:
    a generation processor for analyzing, using a geographical environment model, a geographic environment of the device for objects relevant to a road user;
    a capture processor for capturing parameters of a transmission system to be used for transferring the;
    a data generation processor for generating the data based on the analysis of the geographic environment of the device for the objects relevant to the road user; and
    a transmission device for transferring the generated data based on the parameters of the transmission system and/or depending on the traffic-relevant parameters to the road user, wherein the road user is an emergency vehicle,
    wherein the transmission device alters from transferring the data using a periodic transferring, that occurs in response to an expiration of a regular time interval, to transferring the data using an aperiodic transferring, that occurs in response to a change in the object relevant to the emergency vehicle, and
    wherein the periodic transferring includes delaying transferring the data until the expiration of the regular time interval without the object relevant to the emergency vehicle having been detected thereby indicating that relevant objects have not been detected.

14. The device of claim 13, wherein the device is a transportation vehicle or as a transport infrastructure building.

15. The device of claim 13, wherein the data generation processor generates data in response to at least one of: the detected object being recognized with an overwhelming probability of existence, the detected object having exceeded a change measure, and the detected object recognized with an overwhelming probability of existence having exceeded the change measure.

16. A non-transitory computer-readable storage medium including instructions for carrying out a method for generating and transferring data from a transmitter to a receiver, which is a road user, the method comprising:
    capturing parameters of a transmission system to be used to transfer data and capturing traffic-relevant parameters in a geographic environment of the transmitter, wherein capturing the traffic-relevant parameters includes analyzing, using a geographical environment model, the geographical environment for objects relevant to the road user;
    generating data based on the captured traffic-relevant parameters; and
    transferring to the road user the generated data based on the parameters of the transmission system,
    wherein the road user is an emergency vehicle,
    wherein transferring of the data alters from a periodic transferring, that occurs in response to an expiration of a regular time interval, to an aperiodic transferring, that occurs in response to a change in the object relevant to the emergency vehicle, and
    wherein the periodic transferring includes delaying transferring the data until the expiration of the regular time interval without the object relevant to the emergency vehicle having been detected thereby indicating that relevant objects have not been detected.

17. The method of claim 16, wherein generating of the data is in response to at least one of: the object being recognized with an overwhelming probability of existence, the object having exceeded a change measure, and the object recognized with an overwhelming probability of existence having exceed the change measure.

* * * * *